United States Patent
Borjigin et al.

(10) Patent No.: US 11,440,994 B2
(45) Date of Patent: Sep. 13, 2022

(54) DUAL-CURE METHOD AND SYSTEM FOR FABRICATION OF 3D POLYMERIC STRUCTURES

(71) Applicant: Zhejiang Xunshi Technology Co., Ltd., Shaoxing (CN)

(72) Inventors: Hailun Borjigin, Los Angeles, CA (US); Lingzhu Zhang, Beijing (CN)

(73) Assignee: Zhejiang Xunshi Technology Co., Ltd., Shaoxing (CN)

( * ) Notice: Subject to any disclaimer, the term of this patent is extended or adjusted under 35 U.S.C. 154(b) by 56 days.

(21) Appl. No.: 16/732,178

(22) Filed: Dec. 31, 2019

(65) Prior Publication Data

US 2020/0277442 A1    Sep. 3, 2020

Related U.S. Application Data

(60) Provisional application No. 62/787,231, filed on Dec. 31, 2018.

(51) Int. Cl.
| | |
|---|---|
| *C08G 73/10* | (2006.01) |
| *B29C 64/393* | (2017.01) |
| *B33Y 10/00* | (2015.01) |
| *B29C 64/129* | (2017.01) |
| *B33Y 50/02* | (2015.01) |
| *B33Y 70/00* | (2020.01) |
| *B29K 79/00* | (2006.01) |

(52) U.S. Cl.
CPC ........ *C08G 73/1025* (2013.01); *B29C 64/129* (2017.08); *B29C 64/393* (2017.08); *C08G 73/105* (2013.01); *C08G 73/1028* (2013.01); *B29K 2079/08* (2013.01); *B33Y 10/00* (2014.12); *B33Y 50/02* (2014.12); *B33Y 70/00* (2014.12)

(58) Field of Classification Search
CPC ............ C08G 73/1025; C08G 73/1028; C08G 73/105; C08G 73/1082; B29C 64/129; B29C 64/393; B29C 64/106; B29K 2073/08; B33Y 10/00; B33Y 50/02; B33Y 70/00; C08F 2810/30; C08F 2810/40; C08F 8/14; C08F 8/32; C08F 290/042; C09D 11/101
See application file for complete search history.

(56) References Cited

U.S. PATENT DOCUMENTS

| | | |
|---|---|---|
| 5,328,979 A | 7/1994 | Harris et al. |
| 9,598,606 B2 | 3/2017 | Rolland |
| 9,862,146 B2 | 1/2018 | Driessen |
| 9,925,714 B2 | 3/2018 | Rodgers et al. |
| 9,982,108 B2 | 5/2018 | Lin et al. |
| 9,988,534 B2 | 6/2018 | Miyamoto et al. |
| 2010/0178501 A1 | 7/2010 | Masuko et al. |
| 2012/0225309 A1 | 9/2012 | Rout et al. |
| 2013/0008592 A1 | 1/2013 | Masuda et al. |
| 2014/0097375 A1 | 4/2014 | Ho et al. |
| 2016/0137838 A1 | 5/2016 | Rolland et al. |
| 2016/0177018 A1 | 6/2016 | Soucek |
| 2016/0215096 A1* | 7/2016 | Avakian ............... B33Y 70/00 |
| 2018/0290111 A1 | 10/2018 | Inomata et al. |
| 2018/0370125 A1 | 12/2018 | Rolland et al. |

FOREIGN PATENT DOCUMENTS

| | | |
|---|---|---|
| CN | 105837760 A | 8/2016 |
| JP | 5176147 B2 | 4/2013 |

OTHER PUBLICATIONS

"PCT Search Report and Written Opinion, PCT/US2019/069152", dated Apr. 9, 2020.

* cited by examiner

*Primary Examiner* — Jessica M Roswell
(74) *Attorney, Agent, or Firm* — DLA Piper LLP (US)

(57) ABSTRACT

A dual-cure method for forming a solid polymeric structure is provided. An end-capped, imide-terminated prepolymer is combined with at least one photopolymerizable olefinic monomer, at least one photoinitiator, and a diamine, to form a curable resin composition, which, in a first step, is irradiated under conditions effective to polymerize the at least one olefinic monomer, thus forming a scaffold composed of the prepolymer and the polyolefin with the diamine trapped therein. The irradiated composition is then thermally treated at a temperature effective to cause a transimidization reaction to occur between the prepolymer and the diamine, thereby releasing the end caps of the prepolymer and providing the solid polymeric structure. A curable resin composition comprising an end-capped, imide-terminated prepolymer, at least one photopolymerizable olefinic monomer, at least one photoinitiator, and a diamine, is also provided, as are related methods of use.

30 Claims, No Drawings

DUAL-CURE METHOD AND SYSTEM FOR FABRICATION OF 3D POLYMERIC STRUCTURES

CROSS-REFERENCE TO EARLIER APPLICATIONS

This application claims priority under 35 USC 119(e)(1) to provisional U.S. Patent Application Ser. No. 62/787,231, filed Dec. 31, 2018, the disclosure of which are incorporated by reference herein.

TECHNICAL FIELD

The invention relates generally to the fabrication of three-dimensional objects, and more particularly relates to the fabrication of 3D structures using a "dual cure" system.

BACKGROUND

Three-dimensional (3D) printing typically involves the production of 3D objects via an additive manufacturing (AM) process. Additive manufacturing was originally developed in the early 1980s, and made use of UV-curable liquid resins to form thermoset polymers. A solid structure was built up in layers, with each layer corresponding to a cross-sectional slice of the structure and formed by deposition and photocure of the liquid resin. A stereolithographic additive (SLA) manufacturing process was developed several years later, in which a cross-sectional pattern of the object to be formed was created as digital data, and the object then formed according to the pattern. There have been many developments in the field of 3D printing since then, and many improvements and refinements have been made to the basic additive manufacturing process:

Speed and accuracy have drastically improved, thus enabling the manufacture of extremely small or complex structures with extraordinary precision;

AM is currently implemented on a large-scale commercial level in many fields of use, from the "bioprinting" of blood vessels and organs to integrated circuit manufacture;

Fabrication of prototypes can be carried out quickly and inexpensively via SLA "rapid prototyping," a time- and cost-saving commercial advantage; and the cost of 3D printing materials and equipment has dropped to the point where the technology is accessible to individuals and small businesses as well as large organizations.

There remains a need for improvement, however, particularly with regard to the mechanical properties and surface finish of the manufactured object.

SUMMARY OF THE INVENTION

Accordingly, the invention is directed to methods and compositions that address the aforementioned need in the art.

In one embodiment, the invention provides a dual-cure method for forming a solid polymeric structure, the method comprising:

(a) combining an end-capped, imide-terminated prepolymer with at least one photopolymerizable olefinic monomer, at least one photoinitiator, and a diamine, to form a curable resin composition;

(b) irradiating the resin composition under conditions effective to polymerize the at least one olefinic monomer and provide a polyolefin within a scaffold that comprises the prepolymer and the polyolefin with the diamine physically trapped therein; and (c) thermally treating the irradiated composition at a temperature effective to cause a transimidization reaction to occur between the prepolymer and the diamine, simultaneously releasing the end caps of the prepolymer, and providing the solid polymeric structure.

It will be appreciated that in the implementation of the aforementioned method in the 3D printing arena, the solid polymeric structure corresponds to a 3D object of a predetermined shape and size as embodied in a 3D printable model, such as may be generated using a computer-aided design (CAD) package, a 3D scanner, or photogrammetry software working from a two-dimensional digital image.

In one aspect of the aforementioned embodiment, the curable resin composition generated in step (a) is added to a build region that dimensionally corresponds to the predetermined shape and size of the object, prior to irradiation of the resin in step (b).

In another embodiment, a method is provided for forming a layer of a 3D object such as may be done in the context of an additive fabrication process. The method comprises:

(a) combining an end-capped, imide-terminated prepolymer with at least one photopolymerizable olefinic monomer, at least one photoinitiator, and a diamine, to form a curable resin composition;

(b) providing the curable resin composition as a layer on a substrate, by coating, deposition, or other means; and (c) irradiating the layer under conditions effective to polymerize the olefinic monomer and provide a polyolefin within a scaffold layer that comprises the prepolymer and the polyolefin with the diamine physically trapped therein.

In another embodiment, the invention provides an improved method for forming a 3D object using an additive fabrication process that comprises computer-controlled successive formation of layers on a substrate with dimensions corresponding to a 3D digital image, the improvement which comprises forming the layers by:

(a) providing an initial curable layer on a substrate, wherein the layer comprises a curable resin composition prepared by combining an end-capped, imide-terminated prepolymer, a photopolymerizable olefinic monomer, at least one photoinitiator, and a diamine;

(b) irradiating the initial layer under conditions effective to polymerize the olefinic monomer and provide a polyolefin within a first scaffold layer comprising the prepolymer and the polyolefin with the diamine physically trapped therein;

(c) repeating step (a) to provide an additional layer on the first scaffold layer;

(d) irradiating the additional layer under conditions effective to polymerize the olefinic monomer and provide an additional scaffold layer;

(e) repeating steps (c) and (d) until formation of the 3D object is complete; and (f) thermally treating the 3D object at a temperature effective to cause a transimidization reaction to occur between the prepolymer and the diamine.

In one aspect of any of the aforementioned embodiments, the prepolymer has the structure of Formula (I)

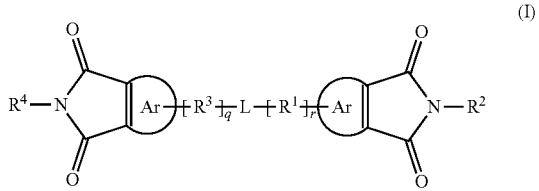

wherein:

L comprises an oligomeric hydrocarbylene moiety that is unsubstituted, substituted, heteroatom-containing, or substituted and heteroatom-containing;

Ar is aryl;

$R^1$ and $R^3$ may be the same or different and are non-oligomeric linking groups;

q and r may be the same or different and are zero or 1; and $R^2$ and $R^4$ are imide end-capping groups that can be removed in a transimidization reaction.

In a related aspect, Ar is phenyl, such that the prepolymer has the structure of Formula (II)

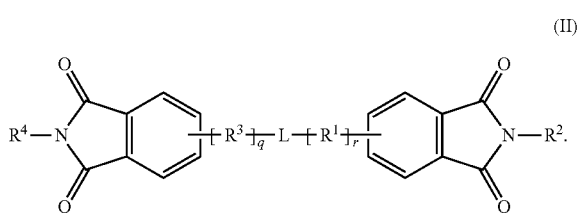

In another related aspect, the prepolymer has a weight average molecular weight in the range of about 500 to about 5000.

In another aspect of any of the above-delineated embodiments, the photopolymerizable olefinic monomer serves as a reactive diluent.

In a related aspect, the photopolymerizable olefinic monomer is an acrylate or methacrylate monomer.

In another related aspect, the photopolymerizable olefinic monomer has the structure of Formula (XIV)

wherein:

$R^5$ is H or $CH_3$ and $R^6$ is $C_1$ to $C_{36}$ hydrocarbyl, substituted $C_1$ to $C_{36}$ hydrocarbyl, heteroatom-containing $C_1$ to $C_{36}$ hydrocarbyl, or substituted and heteroatom-containing $C_1$ to $C_{36}$ hydrocarbyl.

In an additional aspect of any of the above-delineated embodiments, the diamine serves as a chain extender and has the structure of Formula (XV)

where $L^1$ is $C_2$ to $C_{14}$ hydrocarbylene, substituted $C_2$ to $C_{14}$ hydrocarbylene, heteroatom-containing $C_2$ to $C_{14}$ hydrocarbylene, or substituted and heteroatom-containing $C_2$ to $C_{14}$ hydrocarbylene.

In another embodiment, the invention provides as a novel composition of matter a curable resin composition comprising an end-capped, imide-terminated prepolymer, at least one photopolymerizable olefinic monomer, at least one photoinitiator, and a diamine.

In a further embodiment, the invention provides a method for synthesizing the end-capped imide-terminated prepolymer, where the synthetic method comprises:

(a) combining a diphthalic anhydride with an amine-terminated oligomer at a molar ratio of at least about 2:1 under conditions effective to give a phthalimide-terminated oligomer as a reaction product; and (b) end-capping the phthalimide-terminated oligomer by admixing an amino-substituted cyclic reactant with the phthalimide-terminated oligomer at a molar ratio of at least about 2:1 at an elevated temperature for a reaction time of at least about 12 hours.

In a further embodiment, the invention provides a dual-cure method for forming a solid polymeric structure, the method comprising:

(a) synthesizing an end-capped imide-terminated prepolymer by (i) combining a diphthalic anhydride with an amine-terminated oligomer at a molar ratio of at least about 2:1 under conditions effective to give a phthalimide-terminated oligomer as a reaction product, and (ii) end-capping the phthalimide-terminated oligomer by admixing an amino-substituted cyclic reactant with the phthalimide-terminated oligomer at a molar ratio of at least about 2:1 at an elevated temperature for a reaction time of at least about 12 hours;

(b) combining the prepolymer with at least one photopolymerizable olefinic monomer, at least one photoinitiator, and a diamine, to form a curable resin composition;

(c) irradiating the resin composition under conditions effective to polymerize the at least one olefinic monomer and provide a polyolefin within a scaffold that comprises the prepolymer and the polyolefin with the diamine physically trapped therein; and (d) thermally treating the irradiated composition at a temperature effective to cause a transimidization reaction to occur between the prepolymer and the diamine, thereby releasing the end caps of the prepolymer and providing the solid polymeric structure.

In still another embodiment, a method is provided for forming a layer of a three-dimensional object in an additive fabrication process, comprising:

(a) synthesizing an an end-capped imide-terminated prepolymer by (i) combining a diphthalic anhydride with an amine-terminated oligomer at a molar ratio of at least about 2:1 under conditions effective to give a phthalimide-terminated oligomer as a reaction product, and (ii) end-capping the phthalimide-terminated oligomer by admixing an amino-substituted cyclic reactant with the phthalimide-terminated oligomer at a molar ratio of at least about 2:1 at an elevated temperature for a reaction time of at least about 12 hours;

(b) combining the prepolymer with at least one photopolymerizable olefinic monomer, at least one photoinitiator, and a diamine, to form a curable resin composition;

(c) providing the curable resin composition as a layer on a substrate; and (d) irradiating the layer under conditions effective to polymerize the olefinic monomer and provide a polyolefin within a scaffold layer that comprises the prepolymer and the polyolefin with the diamine physically trapped therein.

In another embodiment, the invention provides a photocured composition prepared by irradiating a curable resin composition comprising an end-capped, imide-terminated prepolymer, at least one photopolymerizable olefinic monomer, at least one photoinitiator, and a diamine, with actinic radiation of a wavelength effective to cure the photopolymerizable olefinic monomer.

In still a further embodiment, the invention provides a solid composition of matter prepared by: (a) irradiating a curable resin composition comprising an end-capped, imide-terminated prepolymer, at least one photopolymerizable olefinic monomer, at least one photoinitiator, and a diamine, with actinic radiation of a wavelength effective to cure the photopolymerizable olefinic monomer, thereby providing a photocured composition; and (b) thermally treating the photocured composition provided in (a) with heat under conditions to facilitate a transimidization reaction between the end-capped, imide-terminated prepolymer and the diamine.

DETAILED DESCRIPTION OF THE INVENTION

1. Nomenclature and Overview

Unless defined otherwise, all technical and scientific terms used herein have the meaning commonly understood by one of ordinary skill in the art to which the invention pertains. Specific terminology of particular importance to the description of the present invention is defined below.

In this specification and the appended claims, the singular forms "a," "an" and "the" include plural referents unless the context clearly dictates otherwise. Thus, for example, "a prepolymer" refers not only to a single prepolymer but also to a combination of two or more different prepolymers, "a diamine" refers to a single diamine or to a combination of diamines, and the like.

As used herein, the phrase "having the formula" or "having the structure" is not intended to be limiting and is used in the same way that the term "comprising" is commonly used.

The term "alkyl" as used herein refers to a branched or unbranched saturated hydrocarbon group containing 1 to about 24 carbon atoms, such as methyl, ethyl, n-propyl, isopropyl, n-butyl, isobutyl, t-butyl, octyl, decyl, and the like, as well as cycloalkyl groups such as cyclopentyl, cyclohexyl, and the like. Generally, although again not necessarily, alkyl groups herein contain 1 to about 18 carbon atoms, preferably 1 to about 12 carbon atoms. The term "lower alkyl" intends an alkyl group of 1 to 6 carbon atoms. Preferred lower alkyl substituents contain 1 to 3 carbon atoms, and particularly preferred such substituents contain 1 or 2 carbon atoms (i.e., methyl and ethyl). "Substituted alkyl" refers to alkyl substituted with one or more substituent groups, and the terms "heteroatom-containing alkyl" and "heteroalkyl" refer to alkyl in which at least one carbon atom is replaced with a heteroatom, e.g., O, S, or N. If not otherwise indicated, the terms "alkyl" and "lower alkyl" include linear, branched, cyclic, unsubstituted, substituted, and/or heteroatom-containing alkyl or lower alkyl, respectively.

The term "alkylene" as used herein refers to a difunctional linear, branched, or cyclic saturated hydrocarbon linkage containing 1 to about 24 carbon atoms, such as methylene, ethylene, n-propylene, n-butylene, n-hexylene, decylene, tetradecylene, hexadecylene, and the like. Preferred alkylene linkages contain 1 to about 12 carbon atoms, and the term "lower alkylene" refers to an alkylene linkage of 1 to 6 carbon atoms, preferably 1 to 4 carbon atoms. The term "substituted alkylene" refers to an alkylene linkage substituted with one or more substituent groups, i.e., wherein a hydrogen atom is replaced with a non-hydrogen substituent group, and the terms "heteroatom-containing alkylene" and "heteroalkylene" refer to alkylene linkages in which at least one carbon atom is replaced with a heteroatom. If not otherwise indicated, the terms "alkylene" and "lower alkylene" include linear, branched, cyclic, unsubstituted, substituted, and/or heteroatom-containing alkylene and lower alkylene, respectively. Oligomeric and polymeric "alkylenes" are also envisioned herein, such as, for example, a substituted or unsubstituted, optionally heteroatom-containing poly(ethylene).

The term "alkenyl" as used herein refers to a linear, branched or cyclic hydrocarbon group of 2 to about 24 carbon atoms containing at least one double bond, such as ethenyl, n-propenyl, isopropenyl, n-butenyl, isobutenyl, octenyl, decenyl, tetradecenyl, hexadecenyl, eicosenyl, tetracosenyl, and the like. Generally, although again not necessarily, alkenyl groups herein contain 2 to about 18 carbon atoms, preferably 2 to 12 carbon atoms. The term "lower alkenyl" intends an alkenyl group of 2 to 6 carbon atoms, and the specific term "cycloalkenyl" intends a cyclic alkenyl group, preferably having 5 to 8 carbon atoms. The term "substituted alkenyl" refers to alkenyl substituted with one or more substituent groups, and the terms "heteroatom-containing alkenyl" and "heteroalkenyl" refer to alkenyl in which at least one carbon atom is replaced with a heteroatom. If not otherwise indicated, the terms "alkenyl" and "lower alkenyl" include linear, branched, cyclic, unsubstituted, substituted, and/or heteroatom-containing alkenyl and lower alkenyl, respectively.

The term "alkenylene" as used herein refers to a difunctional linear, branched, or cyclic hydrocarbon linkage containing 2 to about 24 carbon atoms, such as ethenylene, n-propenylene, isopropenylene, n-butenylene, isobutenylene, octenylene, decenylene, tetradecenylene, hexadecenylene, eicosenylene, tetracosenylene, etc. Preferred alkenylene linkages contain 2 to about 12 carbon atoms, and the term "lower alkenylene" refers to an alkenylene linkage of 2 to 6 carbon atoms, preferably 2 to 4 carbon atoms. The term "substituted alkenylene" refers to an alkenylene linkage substituted with one or more substituent groups, i.e., wherein a hydrogen atom is replaced with a non-hydrogen substituent group, and the terms "heteroatom-containing alkenylene" and "heteroalkenylene" refer to alkenylene linkages in which at least one carbon atom is replaced with a heteroatom. If not otherwise indicated, the terms "alkylene" and "lower alkenylene" include linear, branched, cyclic, unsubstituted, substituted, and/or heteroatom-containing alkenylene and lower alkenylene, respectively. Oligomeric and polymeric "alkenylene linkages" are also envisioned herein, such as, for example, a substituted or unsubstituted, optionally heteroatom-containing poly(ethylene) linker, which may form the body of an oligomer or polymer that bridges two end groups.

The term "aryl" as used herein, and unless otherwise specified, refers to an aromatic substituent containing a single aromatic ring or multiple aromatic rings that are fused together, directly linked, or indirectly linked (such that the different aromatic rings are bound to a common group such as a methylene or ethylene moiety). Preferred aryl groups contain 5 to 24 carbon atoms, and particularly preferred aryl groups contain 5 to 14 carbon atoms. Exemplary aryl groups contain one aromatic ring or two fused or linked aromatic rings, e.g., phenyl, naphthyl, biphenyl, diphenylether, diphenylamine, benzophenone, and the like. "Substituted aryl" refers to an aryl moiety substituted with one or more substituent groups, and the terms "heteroatom-containing aryl" and "heteroaryl" refer to aryl substituent, in which at least one carbon atom is replaced with a heteroatom, as will be described in further detail infra. If not otherwise indicated, the term "aryl" includes unsubstituted, substituted, and/or heteroatom-containing aromatic substituents.

The term "arylene" refers to a bivalent aromatic group, containing one to three aromatic rings, either fused or linked, and either unsubstituted or substituted with one or more substituents. Unless otherwise indicated, the term "arylene" includes substituted arylene and/or heteroatom-containing arylene.

The term "alkaryl" refers to an aryl group with an alkyl substituent, and the term "aralkyl" refers to an alkyl group with an aryl substituent, wherein "aryl" and "alkyl" are as defined above. Preferred aralkyl groups contain 6 to 24 carbon atoms, and particularly preferred aralkyl groups contain 6 to 16 carbon atoms. Examples of aralkyl groups include, without limitation, benzyl, 2-phenyl-ethyl, 3-phenyl-propyl, 4-phenyl-butyl, 5-phenyl-pentyl, 4-phenylcyclohexyl, 4-benzylcyclohexyl, 4-phenylcyclohexylmethyl, 4-benzylcyclohexylmethyl, and the like. Alkaryl groups include, for example, p-methylphenyl, 2,4-dimethylphenyl, p-cyclohexylphenyl, 2,7-dimethylnaphthyl, 7-cyclooctyinaphthyl, 3-ethyl-cyclopenta-1,4-diene, and the like. The terms "alkaryloxy" and "aralkyloxy" refer to substituents of the formula —OR wherein R is alkaryl or aralkyl, respectively, as just defined.

The term "acyl" refers to substituents having the formula —(CO)-alkyl, —(CO)-aryl, or —(CO)-aralkyl, and the term "acyloxy" refers to substituents having the formula —O(CO)— alkyl, —O(CO)-aryl, or —O(CO)-aralkyl, wherein "alkyl," "aryl, and "aralkyl" are as defined above.

The term "cyclic" refers to alicyclic or aromatic substituents that may or may not be substituted and/or heteroatom containing, and that may be monocyclic, bicyclic, or polycyclic.

The term "alicyclic" is used in the conventional sense to refer to an aliphatic cyclic moiety, as opposed to an aromatic cyclic moiety, and may be monocyclic, bicyclic, or polycyclic. Alicyclic compounds or substituents may be heteroatom-containing and/or substituted, but are normally unsubstituted and do not contain heteroatoms, i.e., are carbocyclic.

The term "heteroatom-containing" as in a "heteroatom-containing alkyl group" (also termed a "heteroalkyl" group) or a "heteroatom-containing aryl group" (also termed a "heteroaryl" group) refers to a molecule, linkage or substituent in which one or more carbon atoms are replaced with an atom other than carbon, e.g., nitrogen, oxygen, sulfur, phosphorus or silicon, typically nitrogen, oxygen or sulfur, preferably nitrogen or oxygen. Similarly, the term "heteroalkyl" refers to an alkyl substituent that is heteroatom-containing, the term "heterocyclic" refers to a cyclic substituent that is heteroatom-containing, the terms "heteroaryl" and heteroaromatic" respectively refer to "aryl" and "aromatic" substituents that are heteroatom-containing, and the like. Examples of heteroalkyl groups include alkoxyaryl, alkylsulfanyl-substituted alkyl, N-alkylated amino alkyl, and the like. Examples of heteroaryl substituents include pyrrolyl, pyrrolidinyl, pyridinyl, quinolinyl, indolyl, pyrimidinyl, imidazolyl, 1,2,4-triazolyl, tetrazolyl, etc., and examples of heteroatom-containing alicyclic groups are pyrrolidino, morpholino, piperazino, piperidino, etc.

"Hydrocarbyl" refers to univalent hydrocarbyl radicals containing 1 to about 30 carbon atoms, preferably 1 to about 24 carbon atoms, more preferably 1 to about 18 carbon atoms, most preferably about 1 to 12 carbon atoms, including linear, branched, cyclic, saturated, and unsaturated species, such as alkyl groups, alkenyl groups, aryl groups, and the like. "Substituted hydrocarbyl" refers to hydrocarbyl substituted with one or more substituent groups, and the term "heteroatom-containing hydrocarbyl" refers to hydrocarbyl in which at least one carbon atom is replaced with a heteroatom. Unless otherwise indicated, the term "hydrocarbyl" is to be interpreted as including substituted and/or heteroatom-containing hydrocarbyl moieties.

The term "hydrocarbylene" intends a divalent hydrocarbyl moiety containing 1 to about 24 carbon atoms, most preferably 1 to about 12 carbon atoms, including linear, branched, cyclic, saturated and unsaturated species, and the term "lower hydrocarbylene" intends a hydrocarbylene group of 1 to 6 carbon atoms, preferably 1 to 4 carbon atoms. The term "substituted hydrocarbyl" refers to hydrocarbyl substituted with one or more substituent groups, and the terms "heteroatom-containing hydrocarbyl" and "heterohydrocarbyl" refer to hydrocarbyl in which at least one carbon atom is replaced with a heteroatom. Similarly, "substituted hydrocarbylene" refers to hydrocarbylene substituted with one or more substituent groups, and the terms "heteroatom-containing hydrocarbylene" and "heterohydrocarbylene" refer to hydrocarbylene in which at least one carbon atom is replaced with a heteroatom. Unless otherwise indicated, the terms "hydrocarbyl" and "hydrocarbylene" are to be interpreted as including substituted and/or heteroatom-containing hydrocarbyl and hydrocarbylene moieties, respectively. Oligomeric and polymeric hydrocarbylene moieties are also envisioned, including heteroatom-containing hydrocarbylenes such as poly(ethylene oxide) and substituted analogs thereof.

When a functional group is termed "protected" or "capped," as in an "end-capped" group, this means that the group is in modified form to preclude undesired reactions and/or promote a desired reaction. Suitable protecting groups for the compounds of the present invention will be recognized from the present application taking into account the level of skill in the art, and with reference to standard textbooks, such as Greene et al., Protective Groups in Organic Synthesis (New York: Wiley, 1991).

By "substituted" as in "substituted alkyl," "substituted aryl," and the like, as alluded to in some of the aforementioned definitions, is meant that in the alkyl, aryl, or other moiety, at least one hydrogen atom bound to a carbon (or other) atom is replaced with one or more non-hydrogen substituents. Examples of such substituents include, without limitation: functional groups such as halo, hydroxyl, sulfhydryl, $C_1$-$C_{24}$ alkoxy, $C_2$-$C_{24}$ alkenyloxy, $C_2$-$C_{24}$ alkynyloxy, $C_5$-$C_{24}$ aryloxy, acyl (including $C_2$-$C_{24}$ alkylcarbonyl (—CO-alkyl) and $C_6$-$C_{24}$ arylcarbonyl (—CO-aryl)), acyloxy (—O-acyl), $C_2$-$C_{24}$ alkoxycarbonyl (—(CO)—O-alkyl), $C_6$-$C_{24}$ aryloxycarbonyl (—(CO)—O-aryl), halocarbonyl (—CO)—X where X is halo), $C_2$-$C_{24}$ alkylcarbonato (—O—(CO)—O-alkyl), $C_6$-$C_{24}$ arylcarbonato (—O—(CO)—O-aryl), carboxy (—COOH), carboxylato (—COO—), carbamoyl (—(CO)—$NH_2$), mono-($C_1$-$C_{24}$ alkyl)-substituted carbamoyl (—(CO)—NH($C_1$-$C_{24}$ alkyl)), di-($C_1$-$C_{24}$ alkyl)-substituted carbamoyl (—(CO)—N($C_1$-$C_{24}$ alkyl)$_2$), mono-($C_6$-$C_{24}$ aryl)-substituted carbamoyl (—(CO)—NH-aryl), di-($C_6$-$C_{24}$ aryl)-substituted carbamoyl (—(CO)—N(aryl)$_2$), di-N—($C_1$-$C_{24}$ alkyl), N—($C_6$-$C_{24}$ aryl)-substituted carbamoyl, thiocarbamoyl (—(CS)—$NH_2$), carbamide (—NH—(CO)—$NH_2$), cyano(—C≡N), isocyano (—N$^+$≡C$^-$), cyanato (—O—C≡N), isocyanato (—O—N$^+$□C$^-$), isothiocyanato (—S—C≡N), azido (—N=N$^+$=N$^-$), formyl (—(CO)—H), thioformyl (—(CS)—H), amino (—$NH_2$), mono-($C_1$-$C_{24}$ alkyl)-substituted amino, di-($C_1$-$C_{24}$ alkyl)-substituted amino, mono-($C_5$-$C_{24}$ aryl)-substituted amino, di-($C_5$-$C_{24}$ aryl)-substituted amino, $C_2$-$C_{24}$ alkylamido (—NH—(CO)-alkyl), $C_6$-$C_{24}$ arylamido (—NH—(CO)-aryl), imino (—CR=NH where R=hydrogen, $C_1$-$C_{24}$ alkyl, $C_5$-$C_{24}$ aryl, $C_6$-$C_{24}$ alkaryl, $C_6$-$C_{24}$ aralkyl, etc.), alkylimino (—CR=N(alkyl), where R=hydrogen, $C_1$-$C_{24}$ alkyl, $C_5$-$C_{24}$ aryl, $C_6$-$C_{24}$ alkaryl, $C_6$-$C_{24}$ aralkyl, etc.), arylimino (—CR=N(aryl), where R=hydrogen, $C_1$-$C_{24}$ alkyl, $C_5$-$C_{24}$ aryl, $C_6$-$C_{24}$ alkaryl, $C_6$-$C_{24}$ aralkyl, etc.), nitro (—$NO_2$), nitroso (—NO), sulfo (—$SO_2$—OH), sulfonato (—$SO_2$—O—), $C_1$-$C_{24}$ alkylsulfanyl (—S-alkyl; also termed "alkylthio"), arylsulfanyl (—S-aryl; also termed "arylthio"), $C_1$-$C_{24}$ alkylsulfinyl (—(SO)-alkyl), $C_5$-$C_{24}$ arylsulfinyl (—(SO)-aryl), $C_1$-$C_{24}$ alkylsulfonyl (—$SO_2$-alkyl), $C_5$-$C_{24}$ arylsulfonyl (—$SO_2$-aryl), phosphono (—P(O)(OH)$_2$), phosphonato (—P(O)(O—)$_2$), phosphinato (—P(O)(O—)), phospho (—$PO_2$), and phosphino (—$PH_2$); and the hydrocarbyl moieties $C_1$-$C_{24}$ alkyl (preferably $C_1$-$C_{18}$ alkyl, more preferably $C_1$-$C_{12}$ alkyl, most preferably $C_1$-$C_6$ alkyl), $C_2$-$C_{24}$ alkenyl (preferably $C_2$-$C_{18}$ alkenyl, more preferably $C_2$-$C_{12}$ alkenyl, most preferably $C_2$-$C_6$ alkenyl), $C_2$-$C_{24}$ alkynyl (preferably $C_2$-$C_{18}$ alkynyl, more preferably $C_2$-$C_{12}$ alkynyl, most preferably $C_2$-$C_6$ alkynyl), $C_5$-$C_{24}$ aryl (preferably $C_5$-$C_{14}$ aryl), $C_6$-$C_{24}$ alkaryl (preferably $C_6$-$C_{18}$ alkaryl), and $C_6$-$C_{24}$ aralkyl (preferably $C_6$-$C_{18}$ aralkyl).

In addition, the aforementioned functional groups may, if a particular group permits, be further substituted with one or more additional functional groups or with one or more hydrocarbyl moieties such as those specifically enumerated above. Analogously, the above-mentioned hydrocarbyl moieties may be further substituted with one or more functional groups or additional hydrocarbyl moieties such as those specifically enumerated.

The term "polymer" is used to refer to a chemical compound that comprises linked monomers, and that may be straight, branched, or crosslinked. The term also encompasses homopolymers, copolymers, terpolymers, tetrapolymers, and the like. Any polymers identified as containing more than one type of recurring unit, i.e., a copolymer, terpolymer, tetrapolymer, or the like, are not intended to be limited with respect to configuration. That is, for example, copolymers herein may be block copolymers, alternating copolymers, random copolymers, terpolymers may be block terpolymers, random terpolymers, and the like. The term "oligomer" refers to a lower molecular weight, linear polymer that can participate in one or more reactions with itself or with other compounds, e.g., monomers and/or other oligomers, to form a higher molecular weight polymer structure.

When the term "substituted" appears prior to a list of possible substituted groups, it is intended that the term apply to every member of that group. For example, the phrase "substituted alkyl, alkenyl, and aryl" is to be interpreted as "substituted alkyl, substituted alkenyl, and substituted aryl." Analogously, when the term "heteroatom-containing" appears prior to a list of possible heteroatom-containing groups, it is intended that the term apply to every member of that group. For example, the phrase "heteroatom-containing alkyl, alkenyl, and aryl" is to be interpreted as "heteroatom-containing alkyl, substituted alkenyl, and substituted aryl."

"Optional" or "optionally" means that the subsequently described circumstance may or may not occur, so that the description includes instances where the circumstance occurs and instances where it does not. For example, the phrase "optionally substituted" means that a non-hydrogen substituent may or may not be present on a given atom, and, thus, the description includes structures wherein a non-hydrogen substituent is present and structures wherein a non-hydrogen substituent is not present. Similarly, the phrase an "optionally present" bond as indicated by a dotted line ----- in the chemical formulae herein means that a bond may or may not be present.

In one embodiment, then, the invention provides a curable resin composition by combining (i) an end-capped, imide-terminated prepolymer with (ii) a photopolymerizable olefinic monomer, (iii) at least one photoinitiator, and (iv) a diamine; in another embodiment, the invention provides a method for synthesizing the end-capped, imide-terminated prepolymer. The curable resin composition is useful in a dual-cure method for forming a solid polymeric structure, such as in the context of an additive manufacturing process or other method of "3D" printing. The first step of the dual-cure method comprises irradiating the curable resin composition under conditions effective to polymerize the olefinic monomer and provide a polyolefin within a scaffold that comprises the prepolymer and the polyolefin, with the diamine physically trapped therein. In a second step, the photocured composition, i.e., the scaffold formed upon photopolymerization, is thermally treated under conditions effective to facilitate a transimidization reaction between the prepolymer and the diamine, thereby releasing the end caps of the prepolymer and providing a final polymeric structure that has superior mechanical properties and optimal surface characteristics 2. The Photocurable Resin Composition A. The Prepolymer:
The end-capped, imide-terminated prepolymer has the structure of Formula (I)

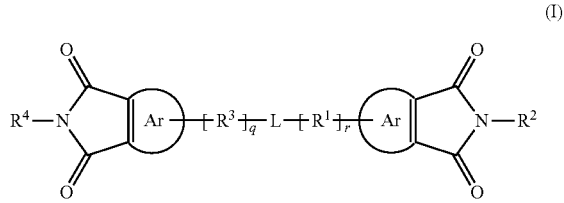

wherein:

L comprises an oligomeric hydrocarbylene moiety, and may be unsubstituted, substituted with one or more non-carbon, non-hydrogen substituents and/or functional groups as explained in Section 1 of this Detailed Description, heteroatom-containing, or both substituted and heteroatom-containing. Accordingly, L can be alkylene, substituted alkylene, heteroalkylene, substituted alkylene, where any heteroatoms present are typically selected from nitrogen, oxygen, and sulfur, but most typically are oxygen atoms. An example of an alkylene "L" is an oligomeric form of polyethylene, and an example of a heteroalkylene "L" is an oligomeric form of poly(ethylene oxide), such that L is

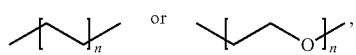

respectively.

where "n" represents the number of the monomer units contained within L. The number of monomer units is generally chosen to provide the prepolymer with a weight average molecular weight in the range of about 500 to about 5000, typically in the range of about 1000 to about 3000.

Ar is aryl, and includes, as explained in the preceding section, unsubstituted aryl, substituted aryl, heteroaryl, and substituted heteroaryl, where Ar may be monocyclic, bicyclic, or polycyclic, wherein, if bicyclic or polycyclic, the rings can be fused or linked. The two Ar moieties shown in Formula (I) may be the same or different, but are typically the same. When Ar is phenyl, the prepolymer has the structure of Formula (II)

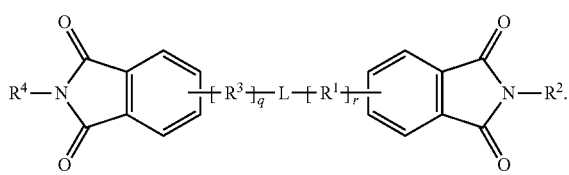
(II)

In Formula (II), it can be seen that the two end groups are phthalimide moieties that are N-substituted with $R^2$ or $R^4$, wherein $R^2$ and $R^4$ are imide end-capping groups that are removed in the transimidization reaction. That is, $R^2$ and $R^4$ are selected so that the following transimidization reaction can proceed upon heating (the reaction is shown in simplified form for illustrative purposes, with only one terminus of the prepolymer shown and a monofunctional $R-NH_2$ reactant instead of the diamine)

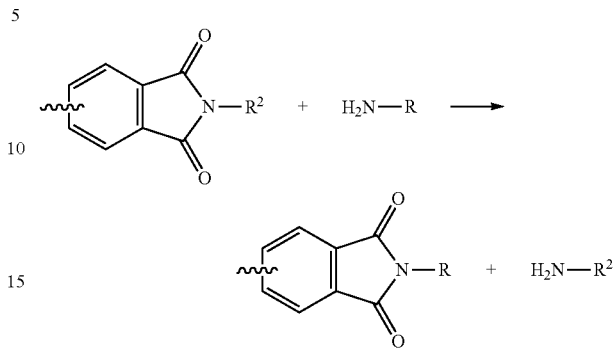

The imide end-capping groups $R^2$ and $R^4$ are generally the same, to facilitate prepolymer synthesis as will be described infra. However, it will be appreciated that the invention does not require that $R^2$ and $R^4$ be identical.

$R^1$ and $R^3$ are optional non-oligomeric linking groups, insofar as r and q are independently selected from zero and 1. As with the end-capping groups $R^2$ and $R^4$, it is preferred although not essential that r and q are the same and, when r and q are 1, that $R^1$ and $R^3$ are the same as well.

In some embodiments, $R^1$ and $R^3$ comprise phthalimide groups, such that the prepolymer has the structure of Formula (III)

(III)

wherein s and t are independently selected from zero and 1, although in a preferred embodiment s and t are the same. X and Y are independently selected from O, S, and lower alkylene (e.g., substituted or unsubstituted methylene, ethylene, n-propylene or n-butylene), although, again, X and Y are preferably the same. When s and t are zero, the prepolymer of Formula (III) has the structure of Formula (IV)

(IV)
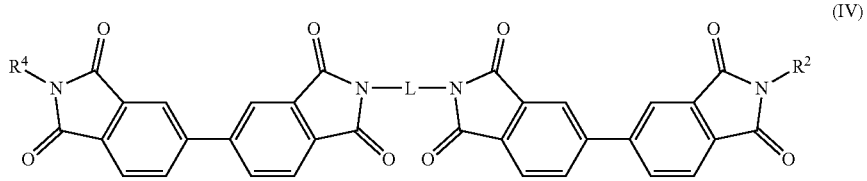

When L is poly(ethylene oxide), the prepolymer of Formula (IV) has the structure shown in Formula (V)

(V)
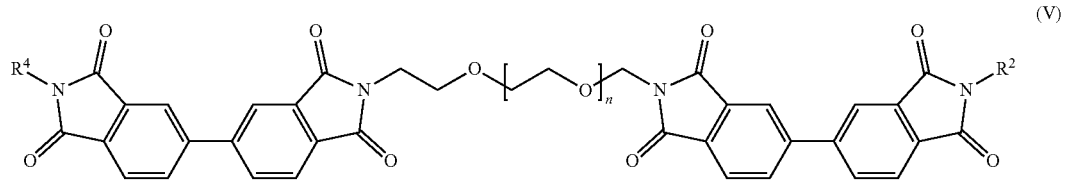

while when L is poly(ethylene), it will be appreciated that the prepolymer of Formula (IV) has the structure of Formula (VI)

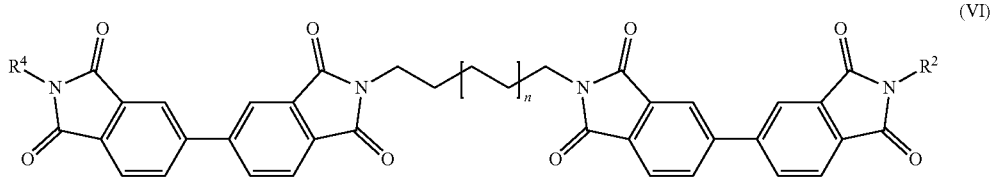

(VI)

When s and t are 1 and X and Y are both O, the prepolymer of Formula (III) has the structure of Formula (VII)

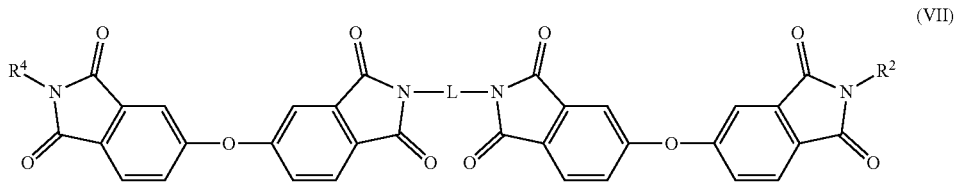

(VII)

wherein when L is poly(ethylene oxide) or poly(ethylene), the prepolymer of Formula (VII) has the structure of Formula (VIII) or Formula (IX), respectively.

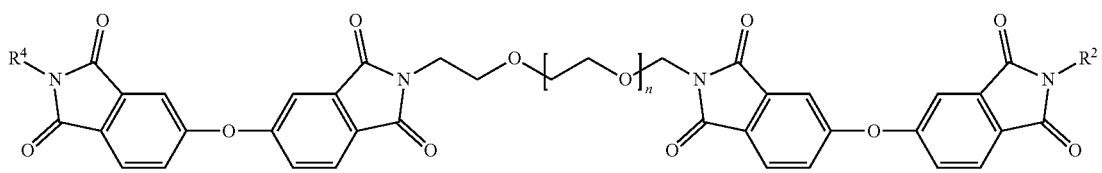

(VIII)

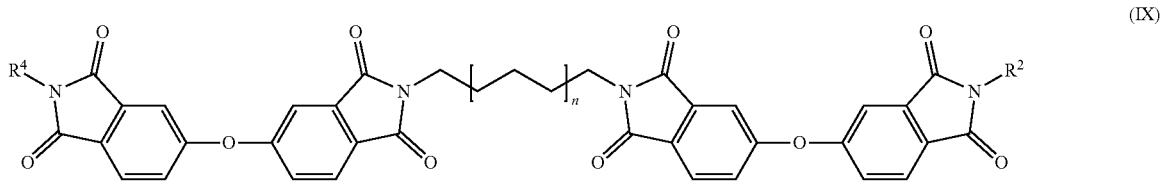

(IX)

The imide end-capping groups $R^2$ and $R^4$, as explained above, are selected to enable a transimidization reaction to occur with the diamine Any such end-capping groups may be advantageously used herein, provided that they facilitate transimidization and do not adversely interact with any components of the curable resin composition or have an adverse impact on the final product.

In some embodiments, the $R^2$ and $R^4$ end-capping moieties are the same and are five- to six-membered cyclic groups containing 1 to 4, preferably 1 to 3, most preferably 1 or 2 heteroatoms, wherein at least one of the heteroatoms is a nitrogen atom and further wherein the ring nitrogen of the phthalimide group is directly bound to a carbon atom of the end-capping moiety. Examples of such end-capping moieties include, without limitation, nitrogen-containing heterocyclic substituents such as pyridinyl, bipyridinyl, pyridazinyl, pyrimidinyl, bipyridaminyl, pyrazinyl, 1,3,5-triazinyl, 1,2,4-triazinyl, 1,2,3-triazinyl, pyrrolyl, 2H-pyrrolyl, 3H-pyrrolyl, pyrazolyl, 2H-imidazolyl, 1,2,3-triazolyl, 1,2,4-triazolyl, indolyl, 3H-indolyl, 1H-isoindolyl, cyclopenta(b)pyridinyl, indazolyl, quinolinyl, bisquinolinyl, isoquinolinyl, bisisoquinolinyl, cinnolinyl, quinazolinyl, naphthyridinyl, piperidinyl, piperazinyl, pyrrolidinyl, pyrazolidinyl, quinuclidinyl, imidazolidinyl, picolyliminyl, purinyl, benzimidazolyl, bisimidazolyl, phenazinyl, acridinyl, and carbazolyl. Preferred nitrogen heterocycles suitable as the imide end-capping groups are aryl, thus including pyrrolyl, imidazolyl, pyrazolyl, triazolyl, pyridinyl, pyrimidinyl, pyridazinyl, and pyrazinyl, as well as substituted analogs thereof.

Representative prepolymers of the invention in which $R^2$ and $R^4$ are pyrimidinyl are shown in the following Formulae (X) through (XIII):

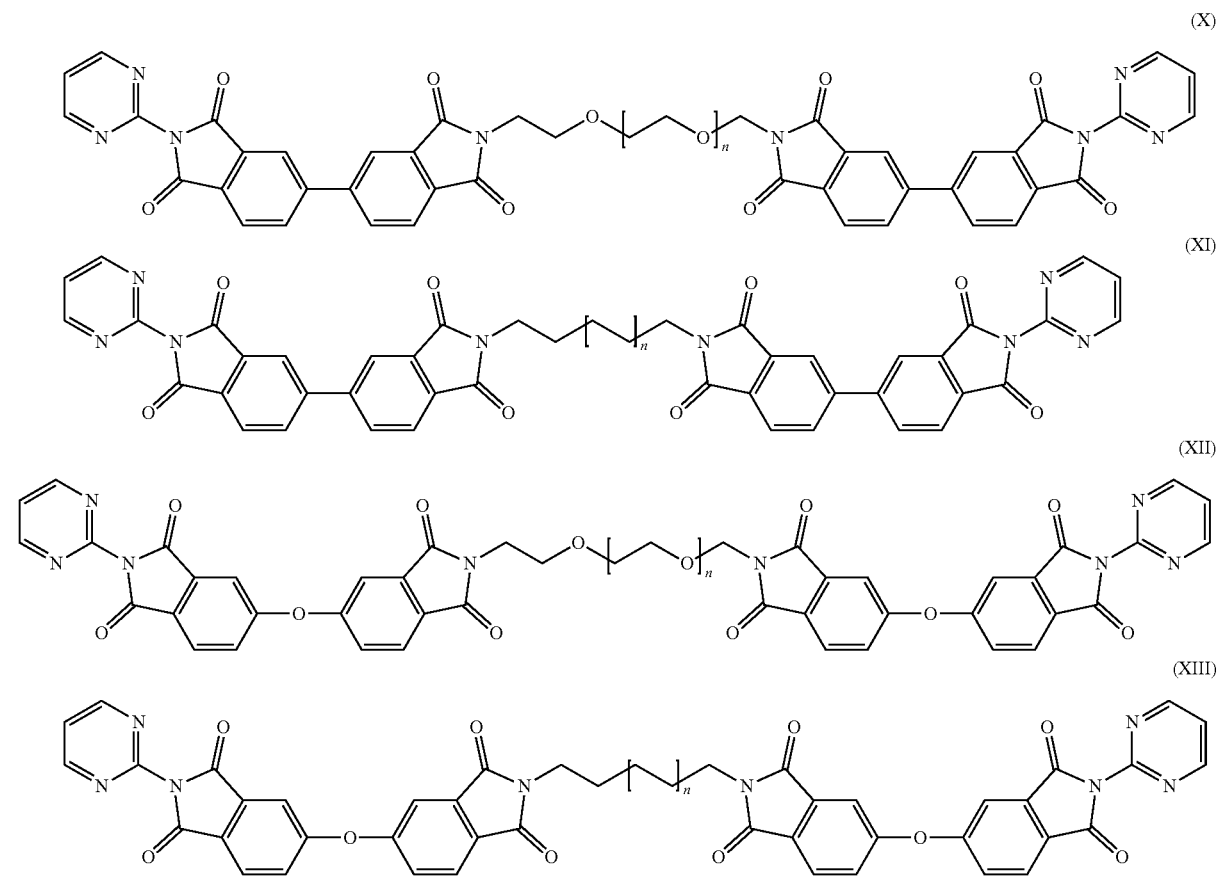

Ideally, the prepolymer has a weight average molecular weight in the range of about 500 to about 5000, typically in the range of about 1000 to about 3000.

B. The Photopolymerizable Olefinic Monomer:

The photopolymerizable olefinic monomer serves as a reactive diluent and, upon irradiation, polymerizes and thereby facilitates formation of a stable, homogeneous network, or scaffold, which can then be thermally treated to form a final polymeric product. In some embodiments, the photopolymerizable olefinic monomer that serves as reactive diluent is an acrylate or methacrylate monomer. In other embodiments, the olefinic monomer comprises a vinyl ester such as vinyl acetate; vinyl chloride; vinyl alcohol; vinyl toluene; styrene; acrylonitrile; propene; butadiene; cyclohexene; or divinyl benzene. It is to be understood that the foregoing monomers are merely illustrative and not limiting; virtually any photopolymerizable olefinic monomer can be advantageously used in conjunction with the present invention.

In some embodiments, the photopolymerizable olefinic monomer, as noted above, is an acrylate or methacrylate monomer, which may be monofunctional, difunctional, or polyfunctional.

By "monofunctional" is meant that the acrylate or methacrylate monomer has one alkenyl functionality, with that functionality being the double bond contained within the acrylate moiety (i.e., the =$CH_2$ at the carbon atom alpha to the carbonyl carbon), although the monomer may comprise one or more aryl moieties. The term "acrylate monomer" as used herein encompasses acrylates and methacrylates, i.e., esters of acrylic acid and methacrylic acid, respectively, as well as higher order acrylic acid esters such as ethyl acrylate, butyl acrylate, and the like. Methacrylates may in some embodiments be preferred relative to acrylates, however, insofar as the photopolymerization reaction (1) tends to proceed in a more controlled fashion with methacrylate monomers relative to acrylate monomers, and (2) may ultimately produce a product that has more desirable mechanical properties and surface finish.

In one embodiment, a photopolymerizable, monofunctional acrylate monomer has the structure of Formula (XIV)

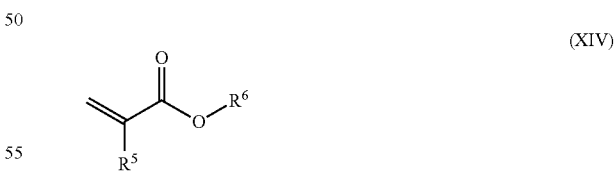

wherein $R^5$ is H or methyl, such that the monomer is an acrylate or a methacrylate, respectively, and $R^6$ is $C_1$ to $C_{36}$ hydrocarbyl, substituted $C_1$ to $C_{36}$ hydrocarbyl, heteroatom-containing $C_1$ to $C_{36}$ hydrocarbyl, or substituted and heteroatom-containing $C_1$ to $C_{36}$ hydrocarbyl, and is typically $C_1$ to $C_{24}$ hydrocarbyl, substituted $C_1$ to $C_{24}$ hydrocarbyl, heteroatom-containing $C_1$ to $C_{24}$ hydrocarbyl, or substituted and heteroatom-containing $C_1$ to $C_{24}$ hydrocarbyl, such as $C_2$ to $C_{16}$ hydrocarbyl, substituted $C_2$ to $C_{16}$ hydrocarbyl, heteroatom-containing $C_2$ to $C_{16}$ hydrocarbyl, or substituted and heteroatom-containing $C_2$ to $C_{16}$ hydrocarbyl, or $C_4$ to $C_{12}$ hydrocarbyl, substituted $C_4$ to $C_{12}$ hydrocarbyl, heteroatom-containing $C_4$ to $C_{12}$ hydrocarbyl, or substituted and heteroatom-containing $C_4$ to $C_{12}$ hydrocarbyl. Within the aforementioned categories, $R^5$ may be, by way of example, $C_1$ to $C_{36}$ alkyl, substituted $C_1$ to $C_{36}$ alkyl, heteroatom-containing $C_1$ to $C_{36}$ alkyl, or substituted and heteroatom-containing $C_1$ to $C_{36}$ alkyl, and typically $C_1$ to $C_{24}$ alkyl, substituted $C_1$ to $C_{24}$ alkyl, heteroatom-containing $C_1$ to $C_{24}$ alkyl, or substituted and heteroatom-containing $C_1$ to $C_{24}$ alkyl, such as $C_2$ to $C_{16}$ alkyl, substituted $C_2$ to $C_{16}$ alkyl, heteroatom-containing $C_2$ to $C_{16}$ alkyl, or substituted and heteroatom-containing $C_2$ to $C_{16}$ alkyl, or $C_4$ to $C_{12}$ alkyl, substituted $C_4$ to $C_{12}$ alkyl, heteroatom-containing $C_4$ to $C_{12}$ alkyl, or substituted and heteroatom-containing $C_4$ to $C_{12}$ alkyl. As noted above, the $R^5$ moiety can also be aryl, including unsubstituted aryl, substituted aryl, heteroaryl, substituted heteroaryl, unsubstituted aralkyl, substituted aralkyl, heteroaralkyl, substituted heteroaralkyl, such as $C_5$ to $C_{36}$ unsubstituted aryl, substituted $C_5$ to $C_{36}$ aryl, $C_2$ to $C_{36}$ heteroaryl, substituted $C_2$ to $C_{36}$ heteroaryl, unsubstituted $C_6$ to $C_{36}$ aralkyl, substituted $C_6$ to $C_{36}$ aralkyl, $C_3$ to $C_{36}$ heteroaralkyl, substituted $C_3$ to $C_{36}$ heteroaralkyl, typically $C_5$ to $C_{24}$ unsubstituted aryl, substituted $C_5$ to $C_{24}$ aryl, $C_2$ to $C_{24}$ heteroaryl, substituted $C_2$ to $C_{24}$ heteroaryl, unsubstituted $C_6$ to $C_{24}$ aralkyl, substituted $C_6$ to $C_{24}$ aralkyl, $C_3$ to $C_{24}$ heteroaralkyl, substituted $C_3$ to $C_{24}$ heteroaralkyl, such as $C_5$ to $C_{16}$ unsubstituted aryl, substituted $C_5$ to $C_{16}$ aryl, $C_2$ to $C_{16}$ heteroaryl, substituted $C_2$ to $C_{16}$ heteroaryl, unsubstituted $C_6$ to $C_{16}$ aralkyl, substituted $C_6$ to $C_{16}$ aralkyl, $C_3$ to $C_{16}$ heteroaralkyl, substituted $C_3$ to $C_{16}$ heteroaralkyl, or $C_5$ to $C_{12}$ unsubstituted aryl, substituted $C_5$ to $C_{12}$ aryl, $C_2$ to $C_{12}$ heteroaryl, substituted $C_2$ to $C_{12}$ heteroaryl, unsubstituted $C_6$ to $C_{12}$ aralkyl, substituted $C_6$ to $C_{12}$ aralkyl, $C_3$ to $C_{12}$ heteroaralkyl, substituted $C_3$ to $C_{12}$ heteroaralkyl. Any heteroatoms are usually N or O, and aryl groups are usually, but not necessarily, monocyclic; fused and linked bicyclic or tricyclic groups are also contemplated.

In some embodiments, $R^6$ comprises a $C_6$-$C_{36}$ alicyclic moiety, typically a bridged (bicyclic or polycyclic) $C_6$-$C_{36}$ alicyclic moiety, and may be substituted and/or heteroatom-containing $R^6$ thus includes optionally substituted and/or heteroatom-containing $C_6$-$C_{24}$ alicyclic and $C_6$-$C_{16}$ alicyclic groups. Non-limiting examples of such groups suitable as $R^5$ include adamantyl, 2-methyl-2-adamantyl, 2-ethyl-2-adamantyl, 5-hydroxy-2-methyl-2-adamantyl, 5-hydroxy-2-ethyl-2-adamantyl, 1-methyl-1-adamantylmethyl, 2-methyl-2-norbornyl, 2-ethyl-2-norbornyl, 1,2,7,7-tetramethyl-2-norbornyl, isobornyl, and the like.

Specific examples of photocurable monofunctional acrylate and methacrylate monomers thus include, without limitation, isobornyl acrylate, isobornyl methacrylate, adamantyl acrylate, adamantyl methacrylate, isodecyl acrylate, isodecyl methacrylate, lauryl acrylate, lauryl methacrylate, 3,3,5-trimethylcyclohexane acrylate, 3,3,5-trimethylcyclohexane methacrylate, (2-(2-ethoxyethoxy) ethyl acrylate, (2-(2-ethoxyethoxy) ethyl methacrylate, cyclic trimethylolpropane formal acrylate, cyclic trimethylolpropane formal methacrylate, tetrahydrofurfuryl acrylate, tetrahydrofurfuryl methacrylate, tridecyl acrylate, tridecyl methacrylate, 2-phenoxy ethyl acrylate, and 2-phenoxy ethyl methacrylate. Other examples will be apparent to those of ordinary skill in the art or can be found in the pertinent texts and literature. See, e.g., U.S. Pat. No. 7,041,846 to Watanabe et al., the disclosure of which is incorporated herein with regard to monofunctional acrylate and methacrylate monomers.

Difunctional acrylate and methacrylate moieties useful in conjunction with the present methods and compositions include tripropyleneglycol diacrylate, 1,6-hexanediol diacrylate, tricyclodecane dimethanol diacrylate, diethyleneglycol dimethacrylate, dipropyleneglycol diacrylate, difunctional glycol acrylate, ethoxylated bisphenol A diacrylates, propyoxylated neopentylglycol diacrylates, neopentylglycol diacrylate, and ethyleneglycol dimethacrylate, while examples of polyfunctional acrylates and methacrylates suitable for use herein include trimethylpropane triacrylate, trimethylpropane trimethacrylate, ethoxylated trimethylpropane triacrylates, propoxylated glyceryl triacrylates, tris-(2-hydroxyethyl) isocyanurate triacrylate, pentaerythritol triacrylate, ethoxylated pentaerythritol tetraacrylates, trimethylolpropane triacrylate (TMPTA), di(trimethylolpropane) tetraacrylate, dipentaerythritol hexaacrylate, and dipentaerythritol hexaacrylate.

C. Polymerization Initiators:

Another component of the curable resin composition is a photopolymerization initiator, or "photoinitiator." As the initial step in the dual-cure process requires photopolymerization of the olefinic monomer, the curable resin composition comprises at least one photoinitiator, i.e., a free radical photoinitiator. The free radical photoinitiator may be, by way of illustration and not limitation: an acylphosphine oxide, such as 2,4,6-trimethylbenzoylethoxyphenylphosphine oxide) (TEPO), diphenyl(2,4,6-trimethylbenzoyl) phosphine oxide (TPO), bis (2,4,6-trimethylbenzoyl) phenylphosphine oxide, or the like; an α-hydroxy ketone, such as 2-hydroxy-2-methyl-1-phenyl acetone, 1-hydroxy-cyclohexyl benzophenone, 2-hydroxy-2-methyl-1-p-hydroxyethylether phenyl acetone, etc.; a diarylketone such as benzophenone, 2,2-dimethoxy-2-phenylacetophenone (DMPA), or benzoyl peroxide; azobisisobutyronitrile (AIBN); or an oxime ester such as those available under the Irgacure tradename from BASF.

D. The Diamine:

The diamine reactant, or "chain extender," is selected to undergo transimidization with the imide end capped prepolymer upon thermal treatment of the photocured resin composition. The diamine has the structure of Formula (XV)

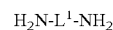

$$H_2N-L^1-NH_2 \qquad (XV)$$

wherein $L^1$ is $C_2$ to $C_{14}$ hydrocarbylene, including unsubstituted, substituted, heteroatom-containing, and substituted heteroatom-containing $C_2$ to $C_{14}$ hydrocarbylene. Typically, $L^1$ is an unsubstituted $C_2$ to $C_{14}$ alkylene group, such that the diamine is 1,3-propanediamine, 1,2-propanediamine, 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 1,2-cyclohexanediamine, 1,4-cyclohexanediamine, or 4,4'-diaminodicyclohexylmethane.

E. Additives:

The curable resin composition can include any of various additives to facilitate the curing processes and provide the final product with one or more advantageous properties. Such additives include, by way of example: tougheners; fillers; stabilizers; non-reactive light absorbers; polymerization inhibitors; colorants including dyes and pigments; thickening agent; detectable compounds (e.g., radioactive or luminescent compounds); metal powders or fibers or other conductive materials; semiconductive particulates or fibers; magnetic materials; flame retardants; and the like. Preferred additives are those described in U.S. Pat. No. 9,598,608 to Rolland et al., incorporated by reference herein

3. New Compositions of Matter

In one embodiment, the invention provides a curable resin composition as a new composition of matter, where the composition comprises: (i) an end-capped, imide-terminated prepolymer; (ii) at least one photopolymerizable olefinic monomer; (iii) at least one photoinitiator, and (iv) a diamine, where each of the components are as defined in A through E above.

In another embodiment, the invention provides a photo-cured composition prepared by irradiating the curable resin composition with actinic radiation of a wavelength effective to cure the photopolymerizable olefinic monomer.

In an additional embodiment, the invention provides a solid composition of matter prepared by: (a) irradiating the curable resin composition with actinic radiation of a wavelength effective to cure the photopolymerizable olefinic monomer; and (b) thermally treating the photocured composition provided in (a) with heat under conditions to facilitate a transimidization reaction between the end-capped, imide-terminated prepolymer and the diamine.

4. Other Embodiments

The invention additionally encompasses other embodiments, wherein a prepolymer other than an end-capped, imide-terminated prepolymer is employed. The process for forming a 3D specimen from such other prepolymers is analogous to that described above with regard to the end-capped, imide-terminated prepolymer. That is, the selected prepolymer is combined with at least one photopolymerizable olefinic monomer, at least one photoinitiator, and a diamine, to form a curable resin composition. The composition is irradiated under conditions effective to polymerize the at least one photopolymerizable olefinic monomer, forming a scaffold that comprises the prepolymer and the polyolefin with the diamine physically trapped therein. The irradiated scaffold is then thermally treated at a temperature effective to allow a cross-linking reaction to occur between the prepolymer and the diamine, providing the solid polymeric structure.

One such embodiment is exemplified in the experimental section herein, in Example 3. That example describes preparation of photocurable ester amide prepolymer, followed by admixture with cyclic trimethylolpropane formal acrylate as the photopolymerizable monomer and the photoinitiator TPO. After thorough mixing, the selected diamine, 4,4'-diaminocyclohexyl methane, is added. The stirred resin mixture thus obtained is then irradiated to polymerize the acrylate monomer followed by heating to crosslink the prepolymer with the diamine.

The photocurable ester amide prepolymer may be generally represented by the structure of Formula (XVI)

wherein the various substituents are as follows:

$R^8$ and $R^{11}$ are bulky substituents typically comprising an optionally substituted, optionally heteroatom-containing hydrocarbyl group, and may be alkyl, aryl, or the like. In some embodiments, $R^8$ and $R^{11}$ comprise hydrocarbyl groups of 3-12 carbon atoms, such as isopropyl, t-butyl, cyclohexyl, or the like. $R^8$ and $R^{11}$ may be the same or different, although are typically identical as a simpler synthesis can be employed.

$R^9$ and $R^{10}$ are difunctional hydrocarbyl groups comprising 1 to 24, typically 2-12, carbon atoms, and may be substituted and/or heteroatom-containing. For example, $R^9$ and $R^{10}$ may be substituted or unsubstituted lower alkylene or phenylene; if phenylene, the linkage is typically in the form of a p-phenylene link.

$L^2$ is an oligomeric hydrocarbyl linker and may be substituted or unsubstituted. $L^2$ is defined as for L; see Section 2.A. of this Detailed Description. Moieties suitable for use as $L^2$ are thus identical to those suitable for use as L.

As another example, the prepolymer may be anhydride-terminated, having the structure of Formula (XVII)

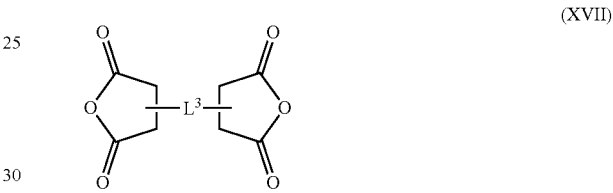

(XVII)

wherein $L^3$ is defined as for L.

Generally, then, the present invention encompasses a dual-cure method for forming a solid polymeric structure, where the method comprises:

(a) combining (i) a prepolymer having end groups that upon heating undergo a covalent reaction with an amine, with (ii) at least one photopolymerizable olefinic monomer, (iii) at least one photoinitiator, and (iv) a diamine, to form a curable resin composition;

(b) irradiating the resin composition under conditions effective to polymerize the at least one olefinic monomer and provide a polyolefin within a scaffold that comprises the prepolymer and the polyolefin with the diamine physically trapped therein; and (c) thermally treating the irradiated composition at a temperature effective to cause a reaction to occur between the prepolymer end groups and the diamine.

It will be appreciated that the reaction between the prepolymer end groups and the diamine results in a cross-linked structure. Thermal treatment and irradiation are carried out as described previously with respect to end-capped, imide-terminated prepolymers.

The prepolymer may, accordingly, be generally represented by the structure of formula (XVIII)

(XVIII)

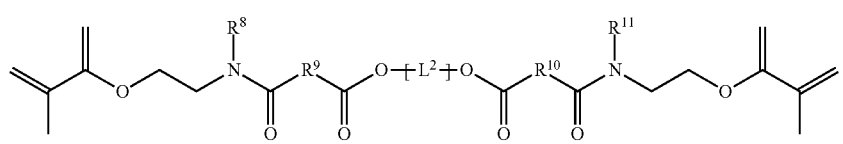

(XVI)

wherein $L^4$ is defined as for L and $R^{12}$ and $R^{13}$ are functional groups that undergo a covalent reaction with an amine, typically a primary amine or a secondary amine, optimally a primary amine, e.g., a diamine containing two primary amine groups.

In some embodiments, the curable resin composition is added to a build region prior to irradiation, the build region dimensionally corresponding to a predetermined shape and size of the 3D structure to be fabricated.

In other embodiments, the method is implemented in the context of an improved additive fabrication process that comprises computer-controlled successive formation of layers with dimensions corresponding to a 3D digital image, the improvement comprising forming the layers by:

(a) providing an initial curable layer on a substrate, wherein the layer comprises a curable resin composition prepared by the prepolymer with at least one photopolymerizable olefinic monomer, at least one photoinitiator, and a diamine;

(b) irradiating the initial layer under conditions effective to polymerize the olefinic monomer and provide a polyolefin within a first scaffold layer comprising the prepolymer and the polyolefin with the diamine physically trapped therein;

(c) repeating step (a) to provide an additional layer on the first scaffold layer;

(d) irradiating the additional layer under conditions effective to polymerize the olefinic monomer and provide an additional scaffold layer;

(e) repeating steps (c) and (d) until formation of the 3D object is complete; and (f) thermally treating the 3D object at a temperature effective to cause a covalent reaction to occur between the prepolymer and the diamine.

It is to be understood that while the invention has been described in conjunction with a number of specific embodiments, the foregoing description as well as the examples that follow are intended to illustrate and not limit the scope of the invention.

Example 1

Synthesis of
N-(2-Pyrimidyl)phthalimide-Terminated Imide
Prepolymer 100.00 g (0.05 mol) of melted anhydrous amine-terminated polyethylene glycol (molecular weight 2000 g/mol) was added into a 500 mL 4-neck flask equipped with an overhead stirrer, a nitrogen inlet, a thermometer and a reverse Dean-Stark trap with a condenser. Then, 31.02 g (0.10 mol) of 4,4'-oxydiphthalic anhydride was added into the flask, followed by addition of 39 mL of cyclohexyl pyrrolidinone. The solution was stirred for 4 hours and an increase in the solution viscosity was observed. The temperature was then increased to 175° C. and stirred for an additional 12 hours. 9.51 g (0.10 mol) of 2-aminopyrimidine was then added into the solution and the solution was stirred at 175° C. for an additional 12 hours. The viscous liquid was then cooled and poured as the final product.

The two-step reaction is illustrated in Scheme 1:

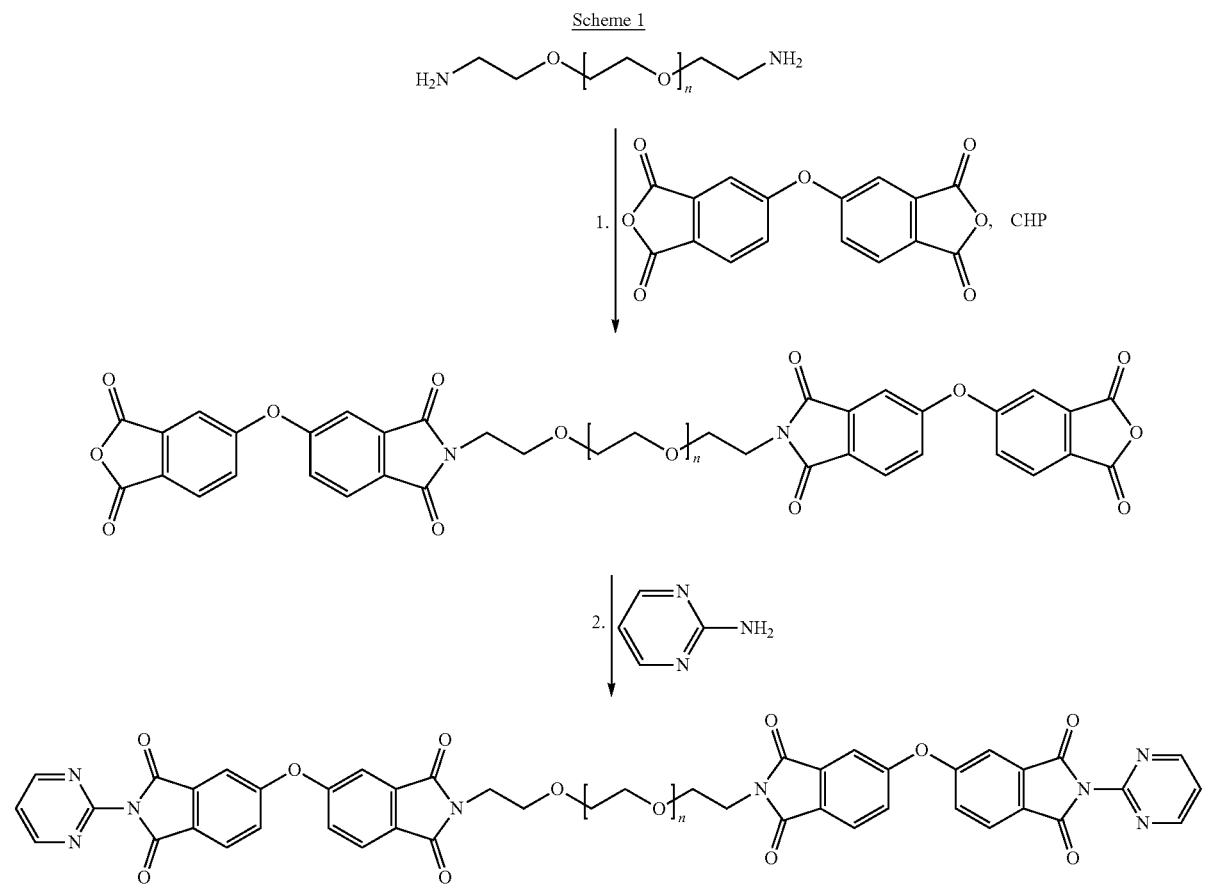

Example 2

Specimen Formation and Testing Using the Phthalimide-Terminated Imide Prepolymer (a) General Procedures:

The prepolymer synthesized in Example 1 was polymerized and cured to form 3D structures as described infra. Tensile properties were evaluated in accordance with the following ISO standards: ISO 37 (2017) Rubber, Vulcanized or Thermoplastic—Determination of tensile stress-strain properties for non-rigid materials; and ISO 527 (2017) Plastics—Determination of tensile properties for rigid materials (International Organization for Standardization, BIBC II Chemin de Blandonnet 8, CP 401, 1214 Vernier, Geneva, Switzerland).

Tensile specimens were loaded onto a GNTS universal testing machine from NCS (NCS Testing Technology No. 13, Gaoliangqiao Xiejie, Haidian District, Beijing, 100081, China) and oriented vertically and parallel to the direction of testing. Cast samples were fully cured using an LED UV chamber (UV wave length=405±5 nm, intensity=130–150× 102 µW/cm$^2$) for 60 seconds. Then, the samples were thermally treated in a convection oven, with specific treatment conditions indicated below. Table 1 indicates the types of tensile specimens tested, general material properties and the associated strain rate.

Measured dogbone samples that do not rupture in the central rectangular section were excluded. Samples that broke in the grips or prior to testing were not representative of the anticipated failure modes and were also excluded from the data.

In order to ensure that the strain rate of the sample was sufficient to capture deformation, the sample was subjected to a tensile fracture test for 30 seconds to 5 minutes.

Depending on the type of the material and pursuant to ISO 37 and ISO 527, Young's modulus (the slope of the stress-strain diagram at 0.05%-0.25% strain), tensile strength at break, tensile strength at yield, percentage of elongation at break, the percentage of elongation at yield, and ultimate tensile strength were measured.

For elastomeric materials having a high elongation at break, a high-speed strain rate is required to break it in the usual range of the specified test. For rigid materials, the ISO standard recommends a modulus of elasticity test rate of 1 mm/min to ensure the lowest strain-at-break will occur within 5 minutes.

(b) Specimen Formation and Evaluation:

The UV-curable N-(2-pyrimidyl)phthalimide-terminated imide prepolymer prepared in Example 1 was thoroughly mixed with isobornyl methacrylate, trimethylolpropane trimethacrylate (TMPTMA), and TPO, using an overhead stirrer, to obtain a homogeneous resin. The resin was cast into a 150 mm×100 mm×4 mm mold and UV cured for 1 minute. Then, the specimen was subjected to a thermal cure by heating at 100° C. for 1 hour, followed by heating at 220° C. for 4 hours. The cured elastomeric sheet so formed was cut into rectangular bars with dimensions of 150 mm×10 mm×4 mm. The individual specimens were tested following ISO 527 on a universal testing machine from NCS for mechanical properties as described above.

The average tensile strength (MPa) and elongation at break (%) are provided in Table 2, along with the weight percent of each component in the transimidization reaction mixture.

TABLE 2

| Component | Weight % |
| --- | --- |
| N-(2-pyrimidyl)phthalimide-terminated imide prepolymer | 50.0 |
| Isobornyl methacrylate | 35.0 |
| TMPTMA | 10.2 |
| TPO | 1.0 |
| 4,4'-Diaminodicyclohexyl methane | 3.8 |
| Tensile Strength MPa) | 16.4 |
| Elongation at Break %) | 218 |

Example 3

Synthesis of a UV-Curable Polyamide Prepolymer 100.0 g (0.05 mol) of melted anhydrous polytetramethylene oxide (molecular weight 2000 g/mol) was added into a 500 mL three-neck flash equipped with an overhead stirrer, a nitrogen inlet and a thermometer. Then, 20.3 g (0.1 mol) terephthaloyl chloride was added to the flask and stirred to give a homogeneous solution with the polytetramethylene oxide. The temperature was increased to 80° C., and the solution stirred for 4 hours. After 4 hours, a vacuum was applied. 30 minutes after gas bubbles disappeared from the solution, the vacuum was removed. The reaction temperature was gradually lowered to 40° C. Then, 37.0 g (0.2 mol) 2-(t-butylamino)ethyl methacrylate was added, and the temperature was increased to 50° C. for 2 hours. The resulting viscous liquid was then poured out as the reaction product.

The two-step reaction is illustrated in Scheme 3 ("Ph" represents phenyl and "t-Bu" represents tertiary butyl).

TABLE 1

| Material Type | Standards | Specimen Type | Strain Rate | Remarks |
| --- | --- | --- | --- | --- |
| Non-rigid | ISO 37 | 1A | 500 mm/min | — |
| Rigid | ISO 527-2 | 5A | 10 mm/min | — |
| Rigid | ISO 527-2 | 5A | 1 mm/min | For Young's Modulus |

Scheme 3

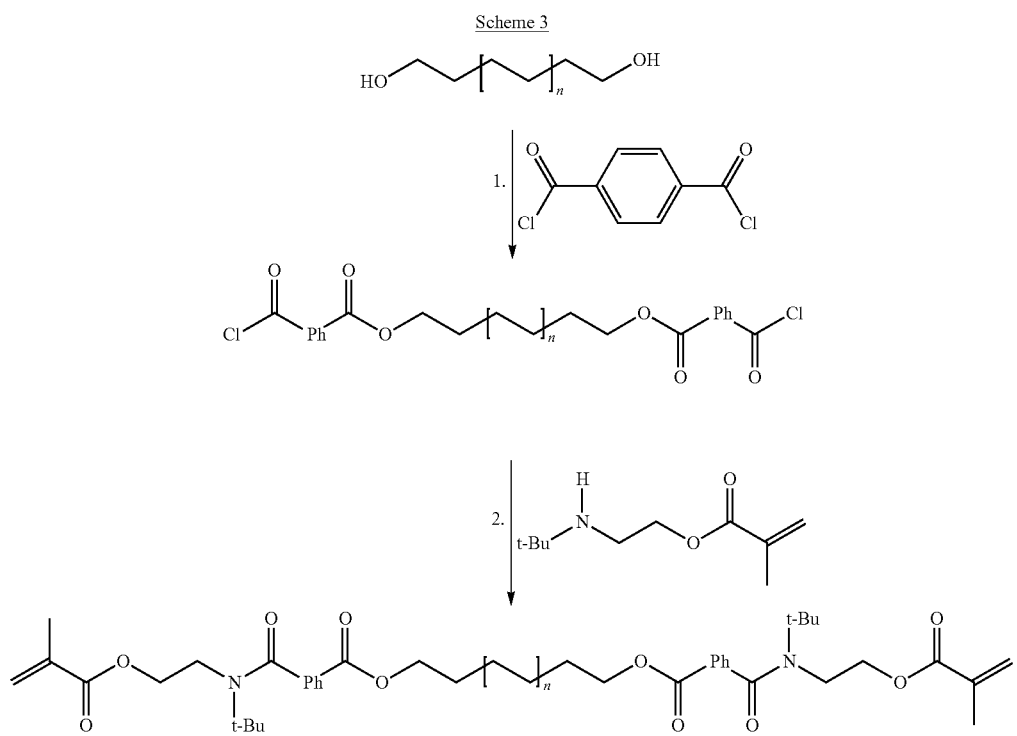

Example 4

Specimen Formation and Testing Using the Polyamide Prepolymer

The general procedures of Example 2 were followed here in the formation and evaluation of a specimen from the UV-curable polyamide prepolymer prepared in Example 3.

The prepolymer of Example 3 was thoroughly mixed with cyclic trimethylolpropane formal acrylate and diphenyl(2,4,6-trimethylbenzoyl) phosphine oxide (TPO) photoinitiator, using an overhead stirrer, to obtain a homogeneous resin. Then, 4,4'-diaminocyclohexyl methane was added and mixing was continued for another 10 min. The resin was cast into a 150 mm×100 mm×4 mm mold and UV cured for 1 minute. Then, the specimen was subjected to a thermal cure by heating at 100° C. for 1 hour, followed by heating at 220° C. for 4 hours. The cured elastomeric sheet so formed was cut into rectangular bars with dimensions of 150 mm×10 mm×4 mm. The individual specimens were tested following ISO 527 on a universal testing machine from NCS for mechanical properties as described above.

The average tensile strength (MPa) and elongation at break (%) are provided in Table 3, along with the weight percent of each component in the transamidation reaction mixture.

TABLE 3

| Component | Weight % |
|---|---|
| UV-Curable polyamide prepolymer | 70.0 |
| Cyclic trimethylolpropane formal acrylate | 24.2 |
| TPO | 1.0 |
| 4,4'-Diaminodicyclohexyl methane | 4.8 |
| Tensile Strength (MPa) | 4.6 |
| Elongation at Break (%) | 236 |

The invention claimed is:

1. In a method for forming a three-dimensional object using an additive fabrication process that comprises computer-controlled successive formation of layers on a substrate with dimensions corresponding to a 3D digital image, the improvement which comprises forming the layers by:
   (a) providing an initial curable layer on a substrate, wherein the layer comprises a curable resin composition prepared by combining an end-capped, imide-terminated prepolymer, a photopolymerizable olefinic monomer, at least one photoinitiator, and a diamine;
   (b) irradiating the initial layer under conditions effective to polymerize the olefinic monomer and provide a polyolefin within a first scaffold layer comprising the prepolymer and the polyolefin with the diamine physically trapped therein;
   (c) repeating step (a) to provide an additional layer on the first scaffold layer;
   (d) irradiating the additional layer under conditions effective to polymerize the olefinic monomer and provide an additional scaffold layer;
   (e) repeating steps (c) and (d) until formation of the 3D object is complete; and
   (f) thermally treating the 3D object at a temperature effective to cause a transimidization reaction to occur between the prepolymer and the diamine wherein the prepolymer has the structure of Formula (I)

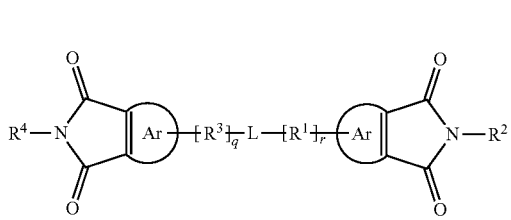

wherein:
  L comprises an oligomeric hydrocarbylene moiety that is unsubstituted, substituted, heteroatom-containing, or substituted and heteroatom-containing;
  Ar is aryl;
  $R^1$ and $R^3$ may be the same or different and are non-oligomeric linking groups;
  q and r may be the same or different and are zero or 1; and
  $R^2$ and $R^4$ are imide end-capping groups that can be removed in a transimidization reaction;
  wherein L comprises a poly(ethylene oxide) chain or a polyethylene chain.

2. The method of claim 1, wherein L is unsubstituted.

3. The method of claim 2, wherein Ar is monocyclic.

4. The method of claim 3 wherein Ar does not contain heteroatoms.

5. The method of claim 4, wherein Ar is phenyl, such that the prepolymer has the structure of Formula (II)

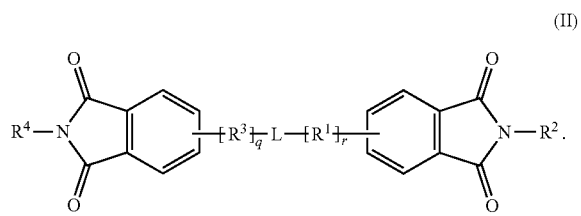

6. The method of claim 5, wherein r and q are 1.

7. The method of claim 6, wherein $R^1$ and $R^3$ are the same, and $R^2$ and $R^4$ are the same.

8. The method of claim 7, wherein $R^1$ and $R^3$ comprise phthalimide groups, such that the prepolymer has the structure of Formula (III)

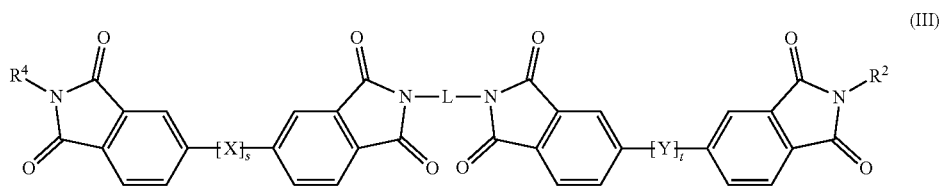

wherein s and t are independently zero or 1, and X and Y are selected from O, S, and lower alkylene.

9. The method of claim 8, wherein s and t are zero, such that the prepolymer has the structure of Formula (IV)

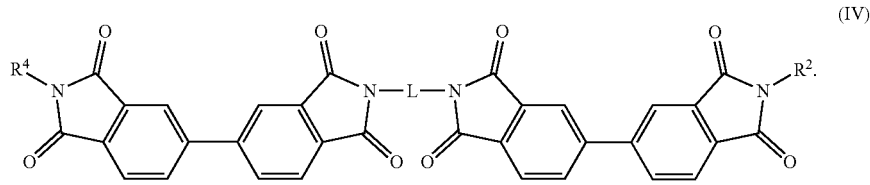

10. The method of claim 9, wherein L is polyethylene, such that the prepolymer has the structure of Formula (V)

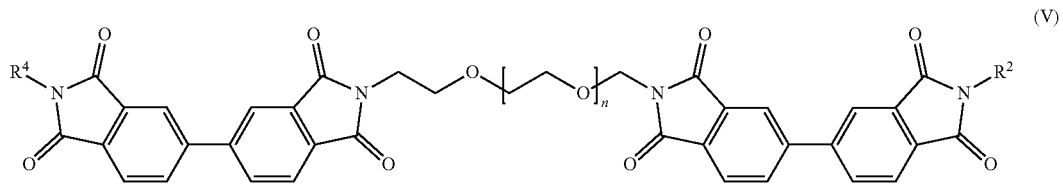

where n is the number of oxyethylene monomer units in L.

11. The method of claim 10, wherein $R^2$ and $R^4$ are both 2-pyrimidinyl, such that the prepolymer has the structure of Formula (X)

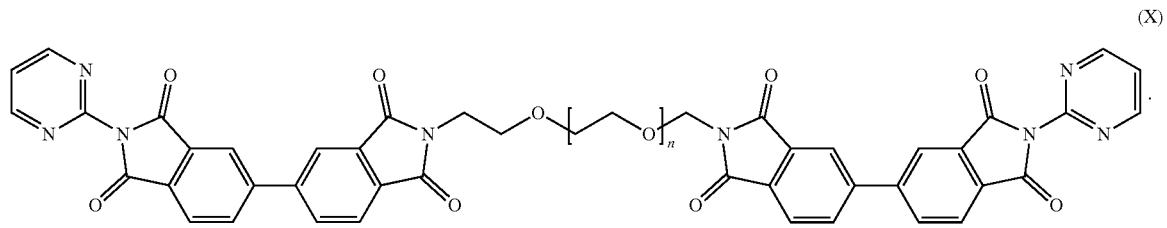
(X)

12. The method of claim 9, wherein L is polyethylene, such that the prepolymer has the structure of Formula (VI)

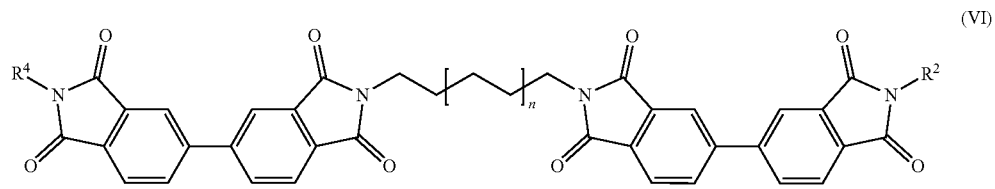
(VI)

wherein n is the number of ethylene monomer units in L.

13. The method of claim 12, wherein $R^2$ and $R^4$ are both 2-pyrimidinyl, such that the prepolymer has the structure of Formula (XI)

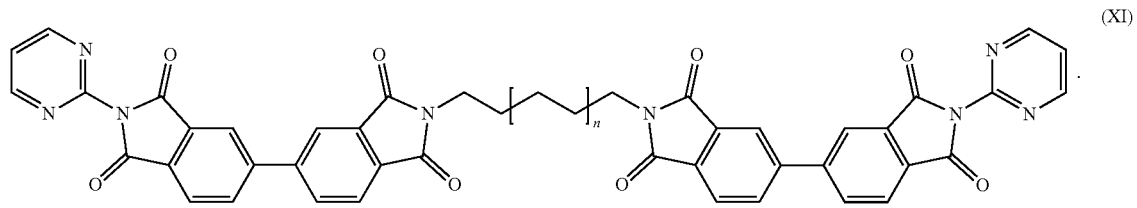
(XI)

14. The method of claim 8, wherein s and t are 1 and X and Y are both O, such that the prepolymer has the structure of Formula (VII)

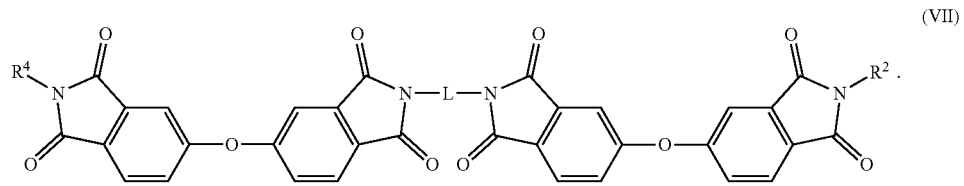
(VII)

15. The method of claim 14, wherein L is poly(ethylene oxide), such that the prepolymer has the structure of Formula (VIII)

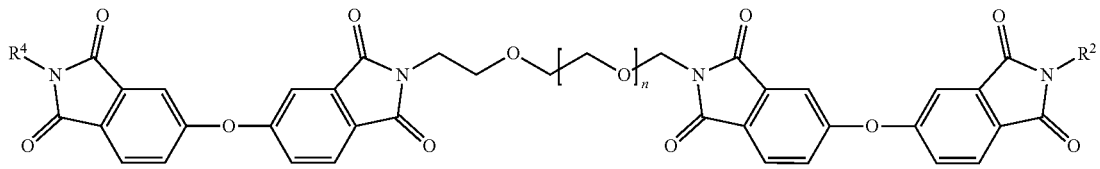

(VIII)

where n is the number of oxyethylene monomer units in L.

16. The method of claim 15, wherein $R^2$ and $R^4$ are both 2-pyrimidinyl.

17. The method of claim 14, wherein L is poly(ethylene), such that the prepolymer has the structure of Formula (IX)

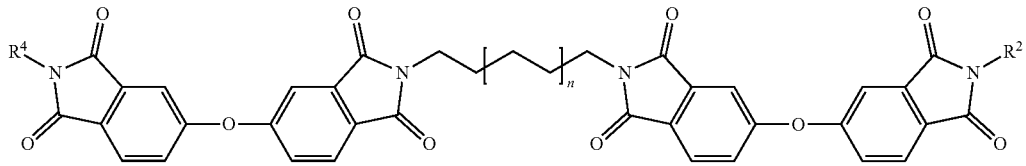

where n is the number of ethylene monomer units in L.

18. The method of claim 17, wherein $R^2$ and $R^4$ are both 2-pyrimidinyl.

19. The method of claim 1, wherein the prepolymer has a weight average molecular weight in the range of about 500 to about 5000.

20. The method of claim 19, wherein the prepolymer has a weight average molecular weight in the range of about 1000 to about 3000.

21. The method of claim 1, wherein the polymerizable olefinic monomer is an acrylate or methacrylate monomer.

22. The method of claim 21, wherein the acrylate or methacrylate monomer has the structure of Formula (XIV)

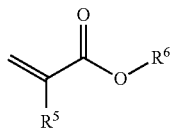

(XIV)

wherein $R^5$ is H or $CH_3$ and $R^6$ is $C_1$ to $C_{36}$ hydrocarbyl, substituted $C_1$ to $C_{36}$ hydrocarbyl, heteroatom-containing $C_1$ to $C_{36}$ hydrocarbyl, or substituted and heteroatom-containing $C_1$ to $C_{36}$ hydrocarbyl.

23. The method of claim 22, wherein $R^6$ comprises a $C_6$-$C_{36}$ alicyclic moiety.

24. The method of claim 23, wherein $R^6$ is isobornyl.

25. The method of claim 1, wherein the diamine has the structure of Formula (XV)

$$H_2N-L^1-NH_2 \qquad (XV)$$

where $L^1$ is $C_2$ to $C_{14}$ hydrocarbylene, substituted $C_2$ to $C_{14}$ hydrocarbylene, heteroatom-containing $C_2$ to $C_{14}$ hydrocarbylene, or substituted and heteroatom-containing $C_2$ to $C_{14}$ hydrocarbylene.

26. The method of claim 25, wherein $L^1$ is unsubstituted $C_2$ to $C_{14}$ alkylene.

27. The method of claim 1, wherein the irradiating is carried out using actinic radiation.

28. The method of claim 27, wherein the actinic radiation is ultraviolet radiation having a wavelength selected to facilitate polymerization of the photopolymerizable olefinic monomer.

29. The method of claim 28, wherein the wavelength is about 405 nm.

30. The method of claim 1, wherein the thermal treatment is carried out at a temperature in the range of about 75° C. to about 300° C.

* * * * *